(12) United States Patent
Hatta et al.

(10) Patent No.: US 7,066,539 B2
(45) Date of Patent: Jun. 27, 2006

(54) VEHICLE SEAT OF RETRACTABLE TYPE

(75) Inventors: Susumu Hatta, Tokyo (JP); Mitsuru Tsukada, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 106 days.

(21) Appl. No.: 10/842,478

(22) Filed: May 11, 2004

(65) Prior Publication Data

US 2005/0057082 A1  Mar. 17, 2005

(51) Int. Cl.
*B60N 2/30* (2006.01)
(52) U.S. Cl. .................. 297/344.14; 297/331; 297/334; 297/15; 296/65.09
(58) Field of Classification Search .............. 297/325, 297/331, 334, 344.14, 344.15, 344.17, 15; 296/65.05, 65.09
See application file for complete search history.

(56) References Cited

U.S. PATENT DOCUMENTS

| | | | | |
|---|---|---|---|---|
| 4,475,769 A | * | 10/1984 | Crawford et al. ............ 297/331 |
| 4,484,776 A | * | 11/1984 | Gokimoto et al. ........ 296/65.09 |
| 4,979,773 A | * | 12/1990 | Eubank .................... 296/65.05 |
| 5,383,699 A | * | 1/1995 | Woziekonski et al. ... 296/65.09 |
| 5,482,349 A | * | 1/1996 | Richter et al. ................ 297/15 |
| 5,570,931 A | * | 11/1996 | Kargilis et al. ......... 297/378.12 |
| 5,941,591 A | * | 8/1999 | Tsuge et al. .............. 296/65.09 |
| 6,270,141 B1 | * | 8/2001 | Moon et al. ............. 296/65.17 |
| 6,293,603 B1 | * | 9/2001 | Waku et al. ............. 296/65.09 |

FOREIGN PATENT DOCUMENTS

JP   2000-108745   4/2000

* cited by examiner

*Primary Examiner*—Peter M. Cuomo
*Assistant Examiner*—Joe Edell
(74) *Attorney, Agent, or Firm*—Browdy and Neimark, PLLC

(57) ABSTRACT

Vehicle seat of retractable type having a rotary support link mechanism, which is displaceable between upper use position and lower storage position. The rotary support link mechanism comprises a forward link element and a backward link element smaller in length than the forward link element, wherein the forward link element has upper and lower pivotal support points between the seat and a vehicle floor, while the backward link element has upper and lower pivotal support points between the seat and vehicle floor. The lower pivotal support point of the backward link element is disposed backwardly of and above the lower pivotal support point of the forward link element, and the backward link element is inclined more backwardly than the forward link element. With this arrangement, the seat can be displaced by operation of motor between the upper use position and lower storage position in a manner analogous to a manual operation.

8 Claims, 7 Drawing Sheets

VEHICLE SEAT OF RETRACTABLE TYPE

BACKGROUND OF THE INVENTION

1. Field of the Invention

The present invention relates to a vehicle seat of retractable type which allows a seat back to be folded onto a seat cushion and further allows both seat back and seat cushion to be rotated donwardly from an upper use position to a lower storage position close to a point where a seat occupant's feet rest on, so that a whole of the seat can be retracted and stored in the storage position.

2. Description of Prior Art

Most of conventional retractable vehicle seats, as disclosed in the Japanese Laid-Open Patent Publication No. 2000-108745 for instance, are operable manually to fold and move both seat back and seat cushion to a storage position. According to such prior art, a seat cushion is rotatably provided on an upper area of a floor where the seat itself is set in a normal use position, i.e. a use position, and also movably supported by a link mechanism disposed forwardly of the seat, which extends from the seat cushion to a lower area of the floor which corresponds to a place on which seat occupant's feet rest. This lower area of floor is the storage position where the seat is retracted and stored. When it is desired to move the seat to the storage position, the seat back is first folded onto the seat cushion, and then, a seat occupant has to manually rotate the thus-folded seat forwardly and donwardly to the storage position. Of course, the seat occupant can manually return the stored seat to the use position for normal use.

However, this kind of manually retractable vehicle seat encounters a great and troublesome labor on the user's side because of a relatively heavy weight of the seat and a too narrow space surrounding the seat in which the user has to move the seat to either of the use and storage positions. Further, the seat requires the following technically difficult points: (i) the seat cushion must be set in a substantially horizontal state in both of the use and storage positions, and, in the storage position, the seat back folded to the seat cushion must also be in a substantially horizontal state since it is used as one of floor, (ii) during the manual operation for moving the seat to either of the use and storage positions, the seat is inevitably inclined forwardly, and therefore, it is structurally required to prevent interference and contact of the forwardly inclined seat with the upper area of floor, and (iii) in such manual operation for moving the seat to either of the use and storage positions, it is necessary to unlock and lock the seat from the upper area of floor. Apparently, a lot of troublesome operations are required in this particular manual retractable seat, thereby resulting in a great degradation of usability and workability of the seat.

One can of course contemplate on an electrically operated or powered structure of retractable seat to solve the foregoing problems. But, if such powered arrangement is applied to the above-stated prior-art seat, the link mechanism disposed forwardly of the seat will be a technical obstacle against operation of a motor in order to realize smooth movement of the seat to either of the use and storage positions in a manner analogous to manual operation by person. To overcome this difficulty will involve a complicated structure and mechanism and increase costs accordingly. Hence, it has been desired to attain a simplified and low-cost structure of powered retractable seat.

SUMMARY OF THE INVENTION

In view of the above-stated drawbacks, it is a first purpose of the present invention to provide an improved vehicle seat of retractable type which permits for automatic smooth displacement of the seat between a high use position and a low storage position in a manner analogous to a manual operation by person.

In order to achieve such purpose, the vehicle seat of this type in accordance with the present invention is basically comprised of:

a basic seat unit including a seat cushion and a seat back rotatably connected with the seat cushion, wherein the seat back is foldable down onto the seat cushion to provide a folded state of the basic seat unit, the basic seat unit having a forward portion facing to a forward side of the vehicle seat, and a backward portion facing to a backward side of the vehicle seat;

a rotary support link mechanism operatively connected between the basic seat unit and the vehicle floor so as to allow displacement of the basic seat unit between the upper use position and the lower storage position, the rotary support link mechanism comprising;

a forward link means having: an upper pivotal support point pivotally connected with the forward portion of said basic seat unit; and a lower pivotal support point pivotally connected with the lower floor area, the forward link mans being rotatable relative to the lower pivotal support point thereof in one of a forward direction to the forward side of the vehicle seat and a backward direction to the backward side of the vehicle seat;

a backward link means having: an upper pivotal support point pivotally connected with the backward portion of said basic seat unit; and a lower pivotal support point, the backward link means being rotatable relative to the lower pivotal support point thereof in one of a forward direction to the forward side of the vehicle seat and a backward direction to the backward side of the vehicle seat; and the said backward link means being small in length than the forward link means, whereby a distance between the upper and lower pivotal support points of the forward link means is different from a distance between the upper and lower pivotal points of the backward link means;

wherein the lower pivotal support point of the backward link means is disposed backwardly of and above the lower pivotal support point of the forward link means;

with such an arrangement that, when the basic seat unit is set in the upper use position, the forward link means is inclined toward the backward side of the vehicle seat at a backward inclination angle, whereas the backward link means is inclined toward the backward side of the vehicle seat at a backward inclination angle which is smaller than the backward inclination angle of the forward link means, whereby the basic seat unit is normally set in a substantially horizontal state upon the upper floor area; and a drive means including a motor and a driving shaft which is operatively connected with the motor and fixedly connected with a lower end portion of the backward link means which corresponds to the lower pivotal support point of the backward link means, wherein, upon normal operation of the motor, a normal rotation of the driving shaft is effected to cause the backward link means to rotate in the forward direction, causing simultaneous forward rotation of the forward link means, thereby inclining and displacing the folded state of the basic seat unit in the forward direction from the substantially horizontal sate, down to the lower storage position, so that, at that particular lower storage position, the folded state of the basic seat unit is set in a substantially horizontal state upon the lower floor area, whereas, upon reverse operation of the motor, a reverse rotation of the driving shaft is effected to cause the backward link means to rotate in the backward direction, causing simultaneous backward rotation of the forward link means, thereby inclining the folded state of the basic seat unit upwardly from the substantially horizontal state and displacing the same from the lower storage position in the backward direction up to the upper use position.

Preferably, the vehicle seat may further comprise a lock/switch means for not only locking and unlocking the basic seat unit to and from the upper use position on the upper floor area, but also switching on to cause operation of the motor simultaneously with said unlocking of the basic seat unit.

It is a second purpose of the present invention to avoid increase of a torque of the motor of the foregoing drive means.

For that purpose, a resilient repulsion providing means is provided to the driving shaft, the resilient repulsion providing means being workable so as to increase its resilient repulsive force in proportion to an amount of the normal rotation of the driving shaft, thereby providing an increasing resilient repulsive force against the normal rotation of the driving shaft, with a correspondingly increased amount of the resilient repulsive force being simultaneously accumulated in the resilient repulsion providing means, whereby, when the basic seat unit is displaced from the upper use position to the lower storage position, a load being applied from the basic seat unit to a normal torque of the motor caused by the normal operation of the motor is counterbalanced with the increasing resilient repulsive force of the resilient repulsion providing means, and, conversely, when the basic seat unit is displaced from the lower storage position to the upper use position, a load being applied from the basic seat unit to a reverse torque of the motor caused by the reverse operation of the motor is counterbalanced with the correspondingly increased amount of the resilient repulsive force accumulated in the resilient repulsion providing means.

Other various features and advantages of the present invention will become apparent from reading of the description hereinafter, with reference to the annexed drawings.

DETAILED DESCRIPTION OF PREFERRED EMBODIMENTS OF THE INVENTION

Referring to FIGS. 1 through 12(C), there is illustrated one preferred embodiment of powered seat of retractable type for use in a vehicle or automobile, generally designated by (10), in accordance with the present invention.

Figure 1:
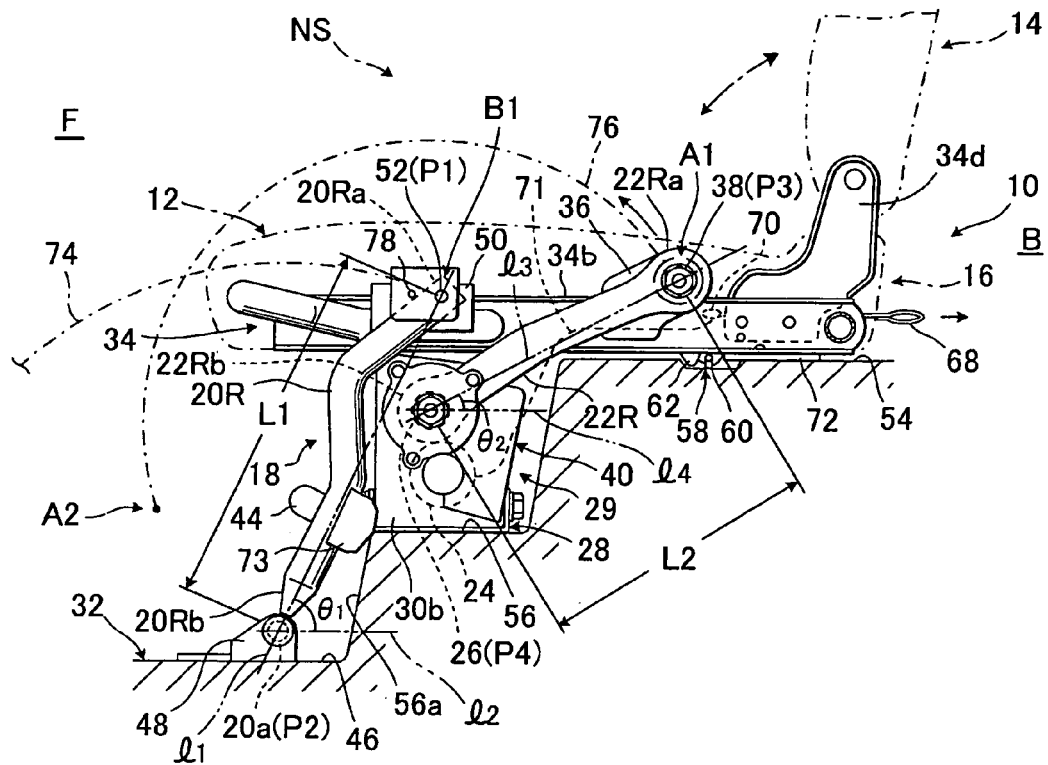
FIG. 1 is a schematic elevational side view of a vehicle seat of retractable type in accordance with the present invention, which shows the state where the vehicle seat is set in a use position.

As shown in FIG. 1, the seat (10) includes a seat cushion (12) and a seat back (14) as a basic seat unit designated by (16) to facilitate the ease of understanding of description hereinbelow.

As is known, the seat cushion (12) is normally set in a generally horizontal use position, while the seat back (14) is set at an upright use position, hence providing a normal unfolded state of the basic seat unit (16) as indicated by one-dot chain lines and designation (NS) in FIG. 1. On the other hand, the seat back (14) is foldable onto the seat cushion (12), with the back side (14a) of the former (14) being exposed outwardly and laying on a substantially horizontal plane, hence providing a folded state of the basic seat unit (16) as indicated by two-dot chain lines and designation (FS) in FIG. 5.

Basically, according to the illustrated mode of seat (10), the seat cushion (12) is movably supported by a rotary support link mechanism (18) upon a terraced type of vehicle floor (32) which has the following three different levels of floor areas: an upper floor area (54); an intermediate stepped floor area (56); and a lower floor area (46) which is substantially in registry with the vehicle floor area on which a seat occupant's feet rest. It is seen that the upper floor area (54) corresponds to an upper use position where the basic seat unit (16) is normally positioned for seating purpose, whereas the lower floor area (46) corresponds to a lower storage position where the basic seat unit (16) is to be retracted and stored, as will be elaborated later.

Sated briefly, the rotary support link mechanism (18) is operated by a motor (24) in order that the folded state (FS) of basic seat unit (16) may be displaced from the upper floor area (54) to the lower floor area (46), or vice versa, through drive mechanism, switch element, and so forth, which will be specified below.

Figure 3:
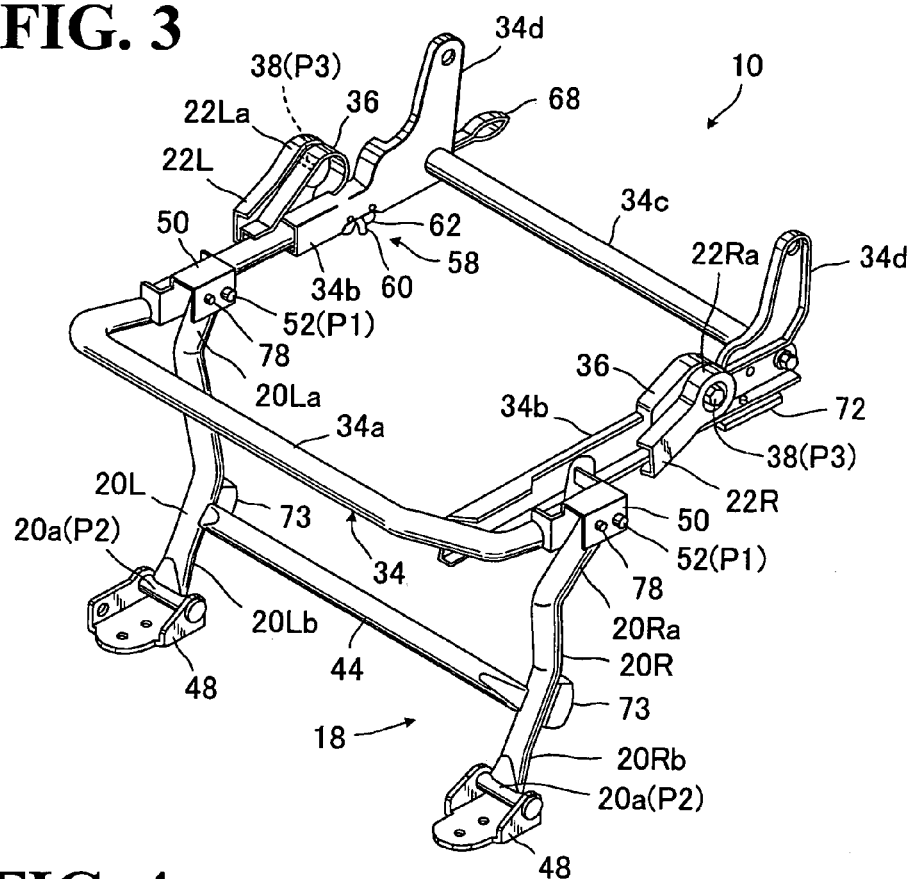
FIG. 3 is a partly broken schematic perspective view showing one of principal parts of the vehicle seat.

As shown in FIGS. 1 and 3, the seat cushion (12) has a seat cushion frame (34) provided therein, which is formed by a forward frame portion (34a), a pair of side frame portions (34b) (34b), and a backward frame portion (34c). Designations (34d) (34d) denote a pair of connecting bracket portions to which a seat back frame (not shown) of the seat back (14) is rotatably connected, thereby allowing the seat back (14) to be folded down forwardly onto the seat cushion (12) and returned therefrom upwardly to the upright use position, as indicated by the one-dot chain lines in FIG. 1.

It is noted that the wording, "forward" or, "forwardly", refers to a direction toward a side (F) forwardly of the seat (10), whereas the wording, "backward", or, "backwardly", refers to a direction toward a side (B) backwardly of the seat (10).

As understandable from FIGS. 1 and 3, the rotary support link mechanism (18) comprises a pair of first and second forward long link members (20R) (20L) and a pair of first and second backward short link members (22R) (22L), thus assuming such a link configuration wherein one pair of links are movably assembled with another pair of links different in length than that one pair of links. In other words, the rotary support link mechanism (18) is based on a four-point articulation structure of two links different in length from each other, as viewed from one lateral side of the rotary support link mechanism (18).

Generally stated, according to the basic mechanical concept about the rotary support link mechanism (18), each forward long link member (20R or 20L) is pivoted at the upper end (20Ra or 20La) thereof to an upper pivot point (P1) disposed at a forward part of the seat cushion (12), while being pivoted at the lower end (20Rb or 20Lb) thereof to a lower pivot point (P2) disposed at the lower floor area (46), and, on the other hand, each backward short link member (22R or 22L) is pivoted at the upper end (22Ra or 22La) thereof to an upper pivot point (P3) disposed at a backward part of the seat cushion (12), while being pivoted at the lower end (22Rb or 22Lb) thereof to a lower pivot point (P4) disposed at the intermediate stepped floor area (56) and forwardly of the seat (10).

Thus, as understandable from FIG. 1, the forward long link member (20R or 20L) has the upper and lower pivotal support points corresponding respectively to the upper and lower pivot points (P1) (P2), and a distance (L1) between those two pivotal support points is larger than a distance (L2) between the upper and lower pivotal support points of the backward short link member (22R or 22L), i.e. a distance between upper and lower pivot points (P3) (P4). As will be discussed later, the backward short link member (22R or 20L) of such small pivotal support point distance (L2) is fixedly connected with a driving shaft (26) to be rotated by the motor (24), and therefore, such backward short link member per se can be defined as a driving link workable to cause displacement of a whole of the rotary link mechanism (18).

Specifically, as seen in FIGS. 1 and 3, a pair of forward side connecting brackets (50) (50) are fixedly coupled with the two side frame portions (34b) (34b) of the seat cushion frame (34), respectively, and a pair of lower connecting brackets (48) (48) are fixedly fastened on the lower floor area (46). The two forward side connecting brackets (50) are each of a generally inverted-U-shaped cross-section having a pivot pin (52) and a guide stopper pin (78) fixedly provided transversely thereof, such that the guide stopper pin (78) is disposed forwardly of the pivot pin (52). As shown, pivotally connected with such pivot pin (52) is the upper end (20Ra or 20La) of each forward long link member (20R or 20L) which also has a pivot pin (20a) formed integrally in the lower end (20Rb or 20Lb) thereof, the pivot pin (20a) being rotatably connected with each of the two lower connecting brackets (48).

It is therefore seen that the two pivot pins (52) (20a) respectively correspond to the upper and lower pivot points (P1) (P2) discussed above.

Accordingly, the two forward long link members (20R) (20L) are pivotally connected between the seat cushion frame (34) and the lower floor area (46) at the two pivot points (P1) (P2). Designation (44) denotes a reinforcing cross frame connected between the two forward long link members (20R) (20L).

As shown in FIG. 3, a pair of upwardly projected backward side connecting brackets (36) (36) are integrally coupled with the respective two side frame portions (34b) (34b) of seat cushion frame (34) at a point backwardly of the foregoing forward side connecting brackets (50).

Figure 2:
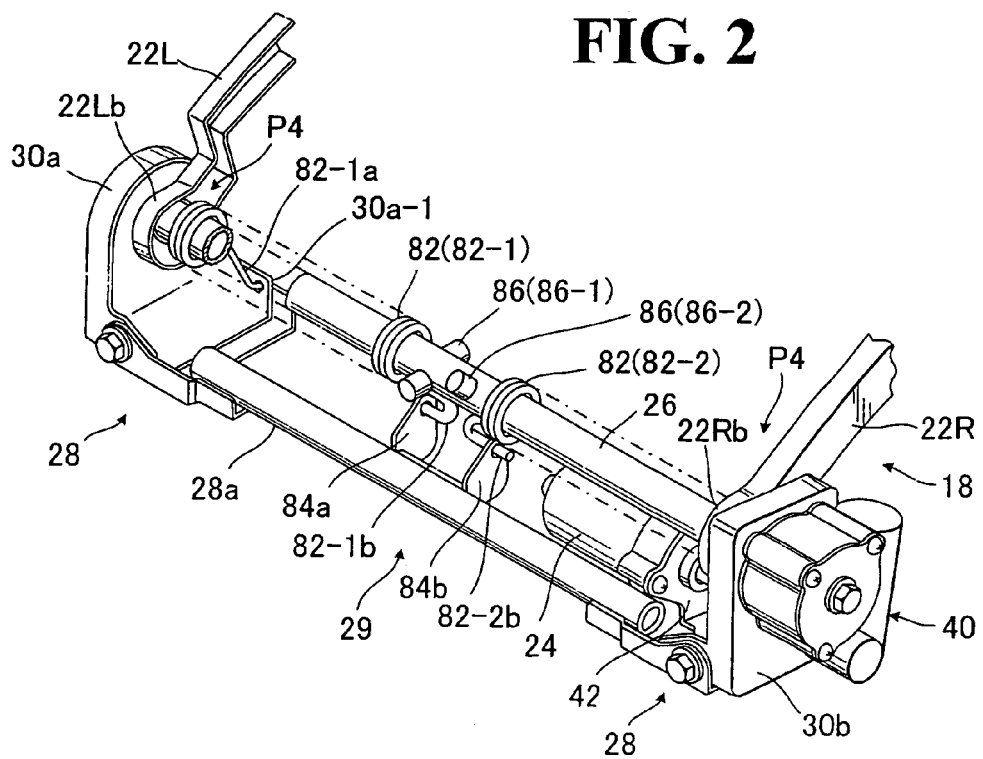
FIG. 2 is a partly broken schematic perspective view of a drive mechanism unit in the vehicle seat.

FIG. 2 shows a drive mechanism unit (29) in which the aforementioned motor (24) and driving shaft (26) are incorporated in an integral manner. The illustrated drive mechanism unit (29) comprises: a pair of base frame portions (28) (28) each having a generally U-shaped cross-section; a pair of first and second upstanding support brackets (30a) (30b); the motor (24); a transmission/reduction gear portion (40); and the driving shaft (26). More specifically, as in FIG. 2, the two base frame portions (28) (28) are firmly connected together by a base tubular frame member (28a), thus forming a bottom base part of this drive mechanism unit (29), and the first and second upstanding support brackets (30a) (30b) are firmly attached on those two base frame portions (28) (28), respectively. As illustrated, the driving shaft (26) is rotatably extended between the first and second upstanding support brackets (30a) (30b), such that one and another end portions thereof are rotatably connected with those particular two brackets (30a) (30b), respectively. The motor (24) are fixedly supported by a support piece (42) integral with the second upstanding support bracket (30b) so as to be disposed under the driving shaft (26). An output shaft of the motor (24) is operatively connected with the driving shaft (26) via the transmission/reduction gear portion (40) provided on the second upstanding bracket (30b), so that normal and reverse operation of the motor (24) causes the corresponding normal and reverse rotation of the driving shaft (26).

The above-constructed drive mechanism unit (29) is securely mounted, at its base frame portions (28) (28), upon the intermediate stepped floor area (56).

As understandable in FIGS. 1, 2 and 3, the two backward short link members (22R) (22L) are each pivotally connected by a pin (38), at the upper end portion (22Ra or 22Lb) thereof, with the corresponding one of the two backward side connecting brackets (36). On the other hand, two lower end portions (22Rb) (22Lb) respectively of the two backward short link members (22R) (22L) are fixedly connected with the two end portions of the driving shaft (26), respectively.

It is therefore seen that both first and second backward short link members (22R) (22L) are rotated by the motor (24), thereby working as driving links to move the seat, whereas by contrast, the first and second forward long link members (20R) (20L) are not connected with such motor (24) and thus they simply work as driven links that are to be rotated by the rotation of the driving links (i.e. 22R and 22L).

Also, it is seen that the aforementioned pins (38) and driving shaft (26) correspond to the upper and lower pivot points (P3) (P4) discussed above, respectively. It is noted here that the pins (38) are disposed at a level higher than the pivot pins (52).

According to the illustrated embodiment, it is observed that each forward long link member (20R or 20L) has an upper pivotal support point at the forward portion of the basic seat unit (16), which corresponds to the first upper pivot point (P1), while having a lower pivotal support point at the lower floor area (46), which corresponds to the second lower pivot point (P2), and that, on the other hand, each backward short link member (22R or 22L) has an upper pivotal support point at the backward portion of the basic seat unit (16), which corresponds to the third upper pivot point (P3), while having a lower pivotal support point at the intermediate stepped floor area (56), which corresponds to the fourth lower pivot point (P4).

It is also observed that the upper pivotal support point (at P3) of the backward short link member (22R or 22L) is disposed at a point above and backwardly of the upper pivotal support point (at P1) of the forward long link member (20R or 20L), facing to the backward side (B), and, likewise, the lower pivotal support point (at P4) of the backward short link member (22R or 22L) is disposed at a point above and backwardly of the lower pivotal support point (at P2) of the forward long link member (20R or 20L), facing to the backward side (B). In this respect, as shown, it is structurally preferable that the lower pivotal support point (at P4) of backward short link member (22R or 22L) be located below the upper pivotal support point (at P1) of forward long link member (20R or 22L) in order to insure optimum retracting actions of the seat (10) via the thus-formed four-point link articulation structure, so that the basic seat unit (16) is stably displaced between the upper horizontal use position at the upper floor area (54) and the lower horizontal storage position at the lower floor area (46), as will be elaborated later.

FIG. 1 shows the seat (10) to be set at a horizontal use position where the seat cushion (12) or the seat cushion frame (34) lies on the horizontal surface of the upper floor area (54), whereupon, normally, the seat back (14) is set in a generally upright use position, thereby allowing a passenger (i.e. a seat occupant) to sit on the basic seat unit (16). Under such use position of seat (10), it is observed that the forward long link member (20R or 20L) is inclined in backward direction by an angle ($\theta_1$) (i.e. a backward inclination angle) and positioned at an inoperative home point (B1), wherein the angle ($\theta_1$) is defined between horizontal rectilinear line (l2) and an inclined rectilinear line (l1) extending rectilinearly between the upper and lower pivot points (P1) (P2) of the forward link member (20R or 20L), and that, on the other hand, the backward short link member (22R or 22L) is inclined backwardly by an angle ($\theta_2$) (i.e. a backward inclination angle) and positioned at an inoperative home point (A1), wherein the angle ($\theta_2$) is defined between a horizontal rectilinear line (l2) and an inclined rectilinear line (l1) extending rectilinearly between the upper and lower pivot points (P3) (P4) of the backward link member (22).

In accordance with the present invention, considering the above-discussed four-point articulation structure of links different in length from each other, it is important that the backward inclination angle ($\theta_2$) of both two backward short link members (22R) (22L) should be smaller than the backward inclination angle ($\theta_1$) of both forward long link members (20R) (20L), so that the basic seat unit (16) is set on a horizontal use position on the horizontal plane of upper floor area (54) in parallel therewith.

In this context, as far as the illustrative embodiment is concerned, the forward long link member (20R or 20L) is bent forwardly at the upper portion thereof to avoid its contact with the drive mechanism unit (29), and the backward short link member (22R or 22L) is also cambered forwardly to avoid its contact with the forward corner portion of the upper floor area (54). This is however just a matter of design and not limitative. At any rate, it is to be understood that such bent forward long link member (20R or 20L) substantially extends along the rectilinear line (l1), forming the above-discussed backward inclination angle ($\theta_1$), whereas such cambered backward short link member (22R or 20L) substantially extends along the rectilinear line (l2), forming the above-discussed backward inclination angle ($\theta_2$) smaller than the foregoing angle ($\theta_1$).

Accordingly, with the above-defined different inclination angles ($\theta_1$) ($\theta_2$), as shown in FIG. 1, the upper pivotal support point (at P1) of each forward long link member (20R or 20L) is set at a predetermined forward home point (B1), and the upper pivotal support point (at P3) of each backward short link member (22R or 22L) is set at a predetermined backward home point (A1), thereby placing the seat cushion frame (34) in a substantially horizontal state. As will be specified later, upon normal operation of the motor (24), both two backward sort link members (22R) (22L) are rotated forwardly or anticlockwise about the lower pivot point (P4), so that the upper pivotal support point (at P3) of the backward short link member (22R or 22L) is displaced from the home point (A1) down to a storage point (A2). At the same time, likewise, both two forward long link members (20R) (20L) are rotated forwardly or anticlockwise about the lower pivot point (P2), so that the upper pivotal support point (at P1) of the forward long link member (22R or 22L) is displaced from the home point (B1) down to a storage point (B2). When the backward and forward link members (22R, 22L, 20R and 20L) have reached both two storage points (A2) (B2), the seat cushion frame (34) is also placed in a horizontal state in parallel with the flat surface of the lower floor area (46). Hence, it can be stated that the four-point link articulation structure with the two different backward inclination angels of links is one of the significant factors in the present invention.

The powered seat (10) is also provided with a lock/switch mechanism (58) which is operable for locking and unlocking the seat (10) to and from the normal home position upon the upper floor area (54), and for switching on the motor (24) simultaneously with the unlocking of the seat (10).

Figure 4:
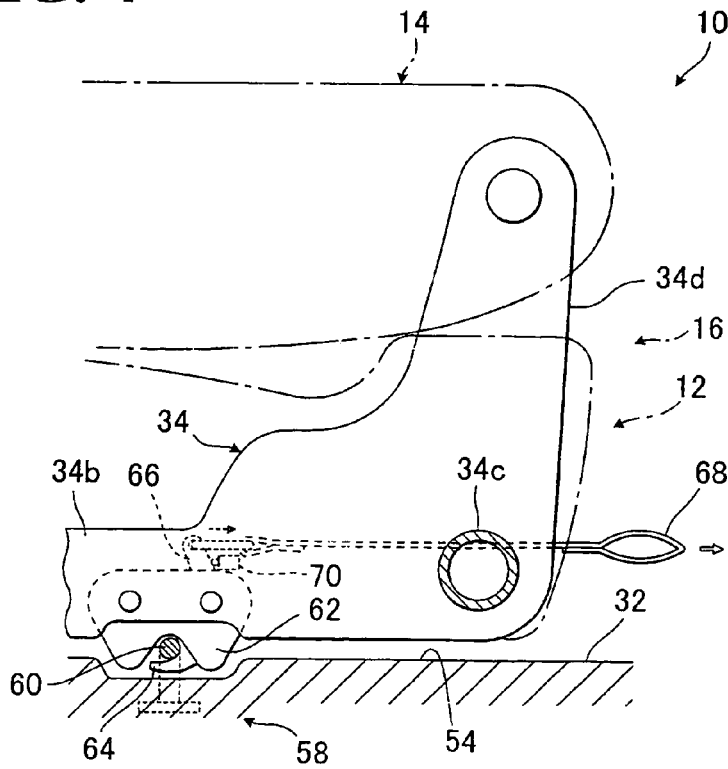
FIG. 4 is a fragmentary enlarged view showing a local backward part of the vehicle seat and a lock/switch mechanism provided therein.
Figure 5:
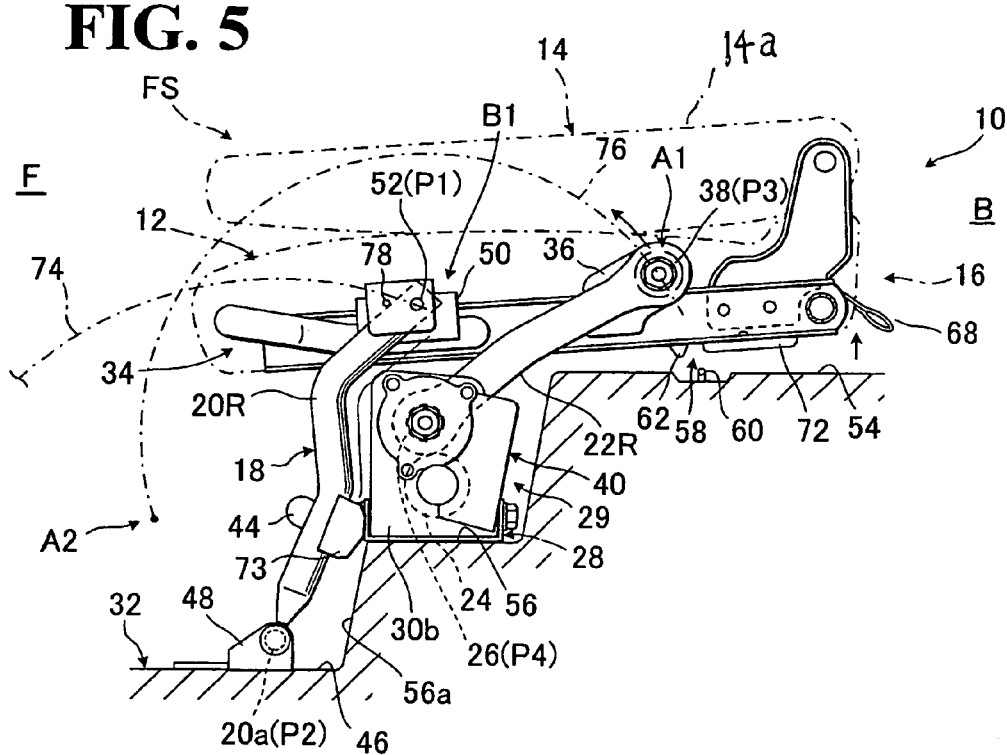
FIG. 5 is a schematic elevational side view which explanatorily shows forward displacement of the vehicle seat.

As shown in FIGS. 3 and 4, according to the lock/switch mechanism (58), a striker (60) is fixedly mounted in the upper floor area (54), and a latch device (62) is fixedly provided in the bottom side of the lateral frame portion (34a) of seat cushion frame (34). The latch device (62) comprises a rotary latch (64) and an actuator lever (66) operatively connected with the rotary latch (64), with such an arrangement that the rotary latch (64) is rotatable for latching engagement and disengagement with and from the striker (60). This kind of latch lock structure is known, for example, from the Japanese Laid-Open Patent Publication No. 2000-108745, and any further detailed description is omitted thereon.

As best shown in FIG. 4, the depression-type switch element (70) is provided so as to be in contact with the actuator lever (66), so that movement of the actuator lever (66) will cause turning on and off the switch element (70). As indicated by the phantom lines in FIG. 1, the switch element (70) is electrically connected with the motor (24), so that depression "on" of the switch element (70) results in normal operation of the motor (24).

As shown, a suitable unlocking element, or an unlocking strap (68), is connected with the actuator lever (66) and extend outwardly and backwardly from the seat (10), thereby making it accessible from the outside. Hence, in brief, when a user or seat occupant grasps and pulls the unlocking strap (68) backwardly from the seat (10) as indicated by the arrow in FIG. 4, the actuator lever (66) is then rotated backwardly, thereby in turn causing anticlockwise rotation of the rotary latch (64) out of engagement with the striker (60), so that the seat (10) is unlocked from the upper floor area (54). Simultaneous therewith, the switch element (70) is depressed "on" by the thus-rotated actuator lever (66), whereupon the motor (24) is operated in normal direction.

With such normal operation of the motor (24), the driving shaft (26) is rotated anticlockwise to cause forward rotation of both two driving links or the first and second backward short link members (22R) (22L) from the home point (A1) to the storage point (A2), and at the same time, the two driven links or the first and second forward long link members (20R) (20L) are also rotated forwardly from the home point (B1) to the storage point (B2).

Designation (72) denotes a dumper fixed to the bottom wall of the lateral frame portion (34b) of the seat cushion frame (34), and designation (73) denotes a dumper provided fixed to each of the forward first and second link members (20R) (20L). These dumpers (72) (73) are intended to absorb shock and noise which is caused when the lateral frame portions (34b) and the two forward link members (20R, 20L) are contacted with the upper floor area (54) and the vertical wall (56a) of the intermediate stepped floor area (56) (or the forward part of the drive mechanism unit (29)).

Referring now to FIG. 2, in accordance with the present invention, a resilient repulsion providing means (82) is provided for preventing a load from being applied from a relatively heavy weight of the basic seat unit (16) to a torque of the driving shaft (26) or the motor (24), when both forward and backward link members (20R, 20L, 22R and 22L) are displaced between their respective home points (B1) (A1) and their respective storage points (B2) (A1).

As shown by way of example, the resilient repulsion providing means (82) is embodied by: a pair of first and second coil torsion springs (82-1) (82-2) which are securely wound about the driving shaft (26); and a pair of first and second actuator pins (86-1) (86-2) which are fixed in the driving shaft (26) in a different angular relation with each other. More specifically, the first and second coil torsion springs (82-1) (82-2) are wound substantially about one and another half portions of the driving shaft (26), respectively, in a spaced-apart relation with each other, while on the other hand, the first and second actuator pins (86-1) (86-2) are disposed in a central area of the driving shaft (26) corresponding to a space between the two coil torsion springs (82-1) (82-2).

The first coil torsion spring (82-1) has a base end (82-1a) fixedly secured to a lower portion (30a-1) of the first upstanding support bracket (30a) and an engagement end (82-1b) which is normally resiliently engaged in a first engagement hook bracket (84a). The first engagement hook bracket (84a) is fixed on the forward tubular frame member (28a). Likewise, as can be seen from FIG. 11 in conjunction with FIG. 2, the second coil torsion spring (82-2) has a base end (82-2a) fixedly secured to a lower portion (30b-1) of the second upstanding support bracket (30b) and an engagement end (82-2b) which is normally resiliently engaged in a second engagement hook bracket (84a) fixed on the forward tubular frame member (28a).

Figure 9:
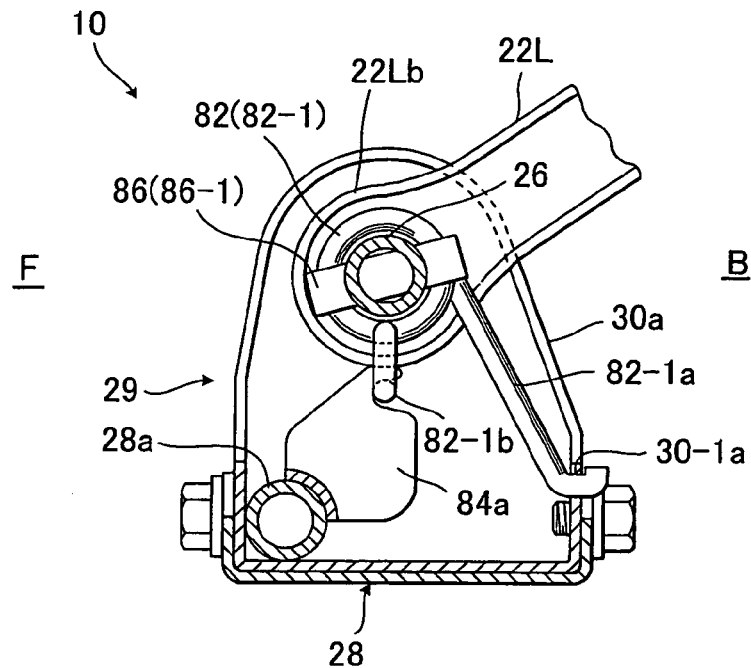
FIG. 9 is a partial fragmentary sectional view of one side of the drive mechanism unit.
Figure 11:
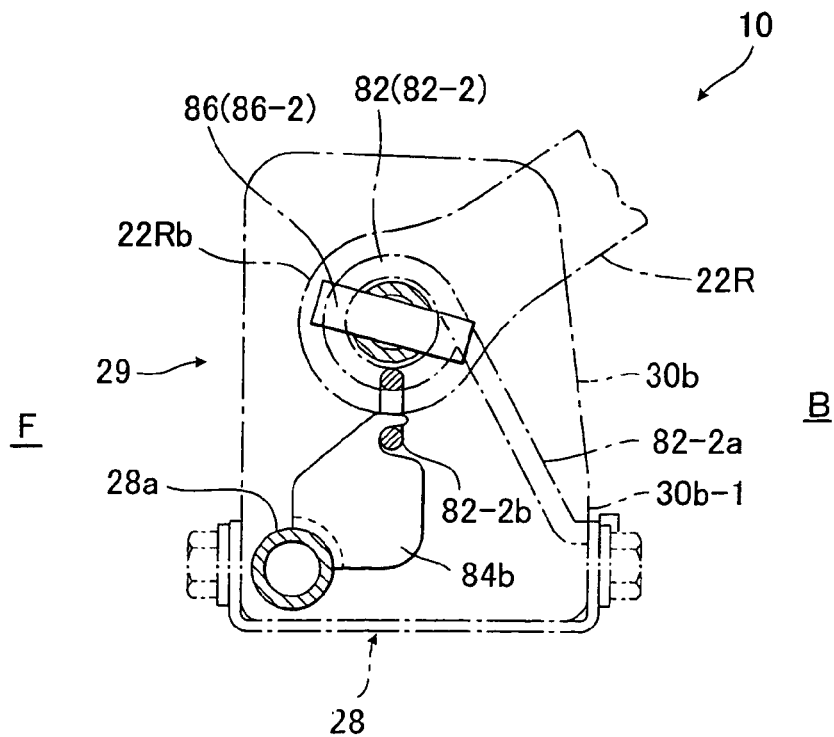
FIG. 11 is a partial fragmentary sectional view of another side of the drive mechanism unit.
Figure 10:
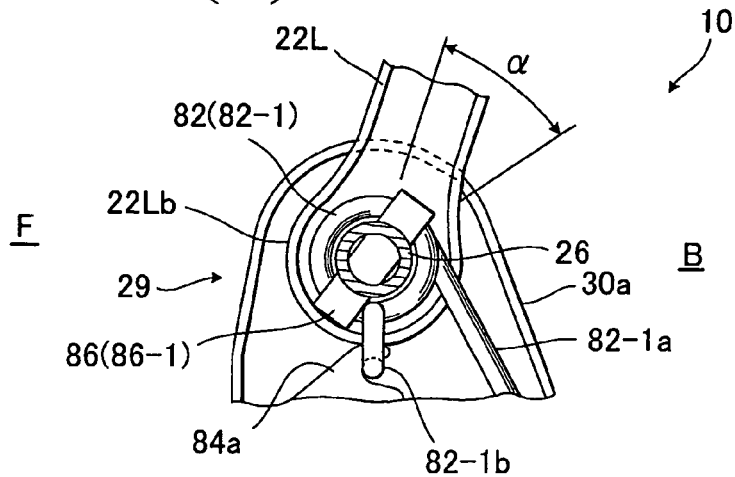
FIGS. 10(A), 10(B) and 10(C) are fragmentary sectional views for explanatorily showing the rotation of a first actuator pin and the twisting of a first torsion coil spring.
Figure 10:
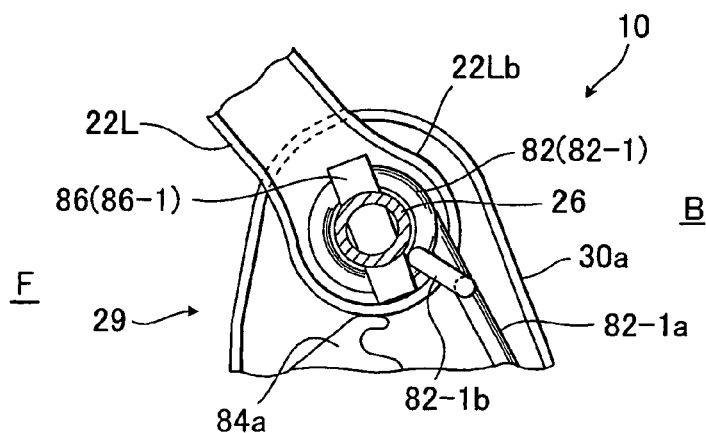
Figure 10:
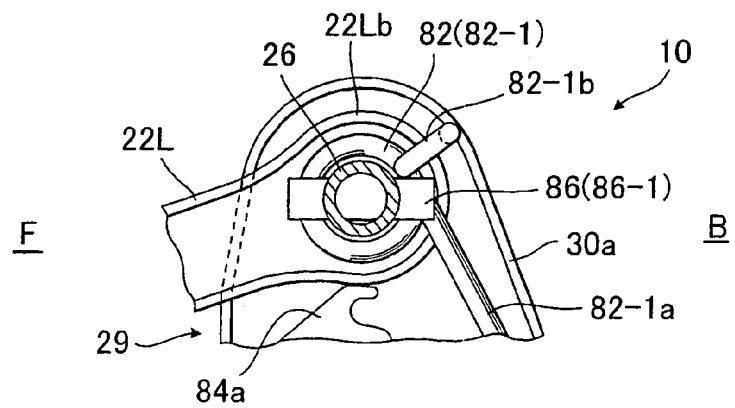
Figure 12:
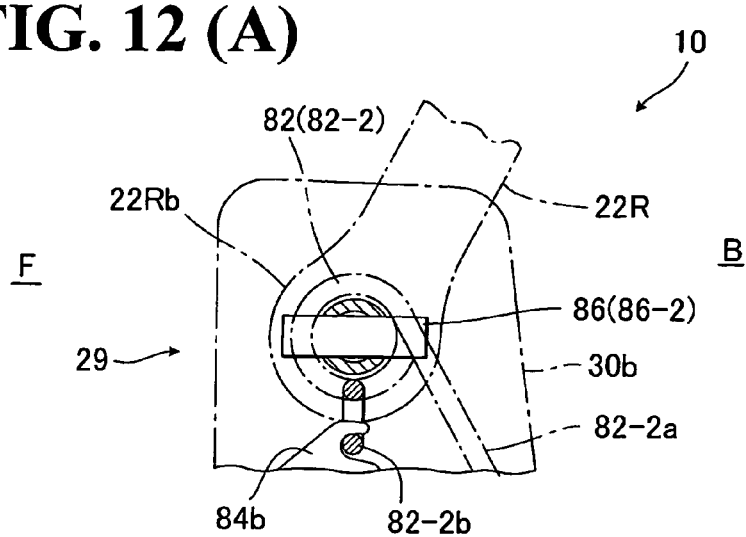
FIGS. 12(A), 12(B) and 12(C) are fragmentary sectional views for explanatorily showing the rotation of a second actuator pin and the twisting of a second torsion coil spring.
Figure 12:
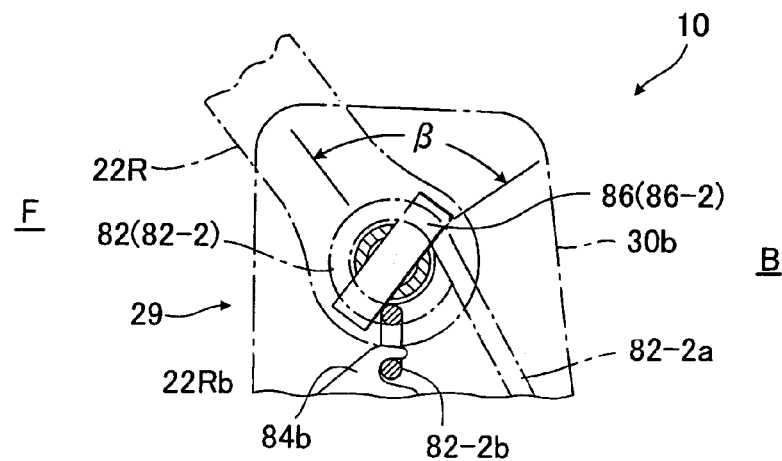
Figure 12:
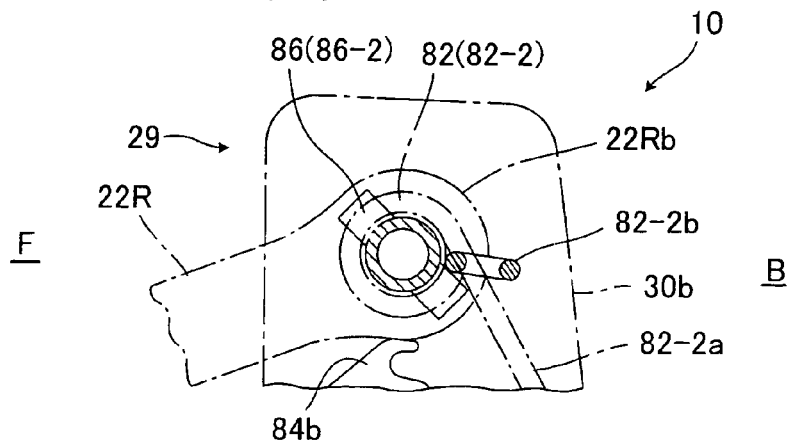

As shown in FIG. 9, normally, when the backward short link members (22R) (22L) are set at the normal home position stated above, where their upper pivotal support points (P3) are at the home points (A1), the first actuator pin (86-1) is positioned at a point where it projects from the driving shaft (26) in a donwardly inclined way at a predetermined angle with respect to a vertical line along which the engagement end (82-1b) of the first torsion coil spring (82-1) extends downwardly and engages the first engagement hook bracket (84a). By contrast, under that normal state, as in FIG. 11, the second actuator pin (86-2) is positioned at a point where it projects from the driving shaft (26) in upwardly inclined way at a predetermined angle with respect to a vertical line along which the engagement end (82-2b) of the second torsion coil spring (82-2) downwardly extends and engages the second engagement hook bracket (84b). In this respect, comparative view of the FIGS. 9 and 11 indicates that an angle between the first actuator pin (86-1) and the engagement end (82-1b) of the first torsion coil spring (82-1) is smaller than the angle between the second actuator pin (86-2) and the engagement end (82-2b) of the second torsion coil spring (82-2) for a two-step biasing purpose to be set forth later.

Now, a specific description will be made of operation of the above-described seat (10).

In the drawings excepting FIG. 3, only the first forward and backward link members (20R) (22R) are shown, but, it is noted that, while not shown, since those two link members (20R) (22R) are identical in structure and motion to the second forward and backward link members (20L) (22L), the description hereinafter will be only devoted to the action of both first and second forward and backward link members (20R) (22R) for the sake of easy and precise understanding.

As can be seen in FIGS. 1 and 3, the seat (10) is set in the upper use position upon the upper floor area (54), the first and second backward link members (22R) (22L) are retained at the backward inclination angle ($\theta_2$) by the stopped state of the motor (24), while the first and second forward link members (20R) (22L) are retained at the backward inclination angle ($\theta_1$) by contact of each of the two guide stopper pins (78) with each of the two upper ends (20Ra) (29La) respectively of those particular forward link members (20R) (20L).

At first, after having folded down the seat back (14) onto the seat cushion (12) to place the basic seat unit (16) in the folded state (see FIG. 5), a user or seat occupant has to pull the unlocking strap (68) backwardly as indicated by the corresponding arrow in FIG. 1. Then, the actuator link (66) is moved backwardly to depress "on" the switch element (70), while simultaneously, the rotary latch (64) is disengaged from the striker (60), as result of which, the motor (24) is operated in normal direction to cause anticlockwise rotation of the driving shaft (26). Both first and second backward link member (22R) (22L) are thus rotated forwardly or anticlockwise relative to the lower pivotal support point (P4) (i.e. at 26) from their home points (A1), as driving links, thereby causing simultaneous forward or anticlockwise rotation of both first and second backward link members (22R) (22L) relative to the lower pivotal support point (P2) (i.e. at 20a) from their home points (B1).

Figure 7:
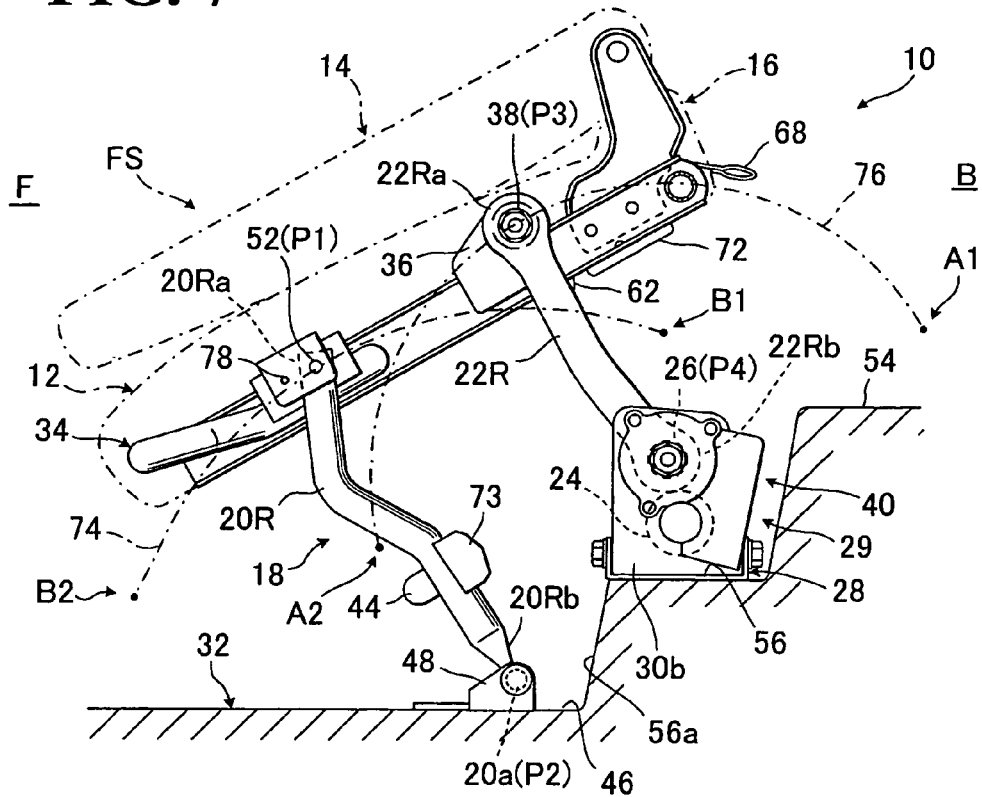
FIG. 7 is a schematic elevational side view which explanatorily shows still further forward displacement of the vehicle seat.
Figure 8:
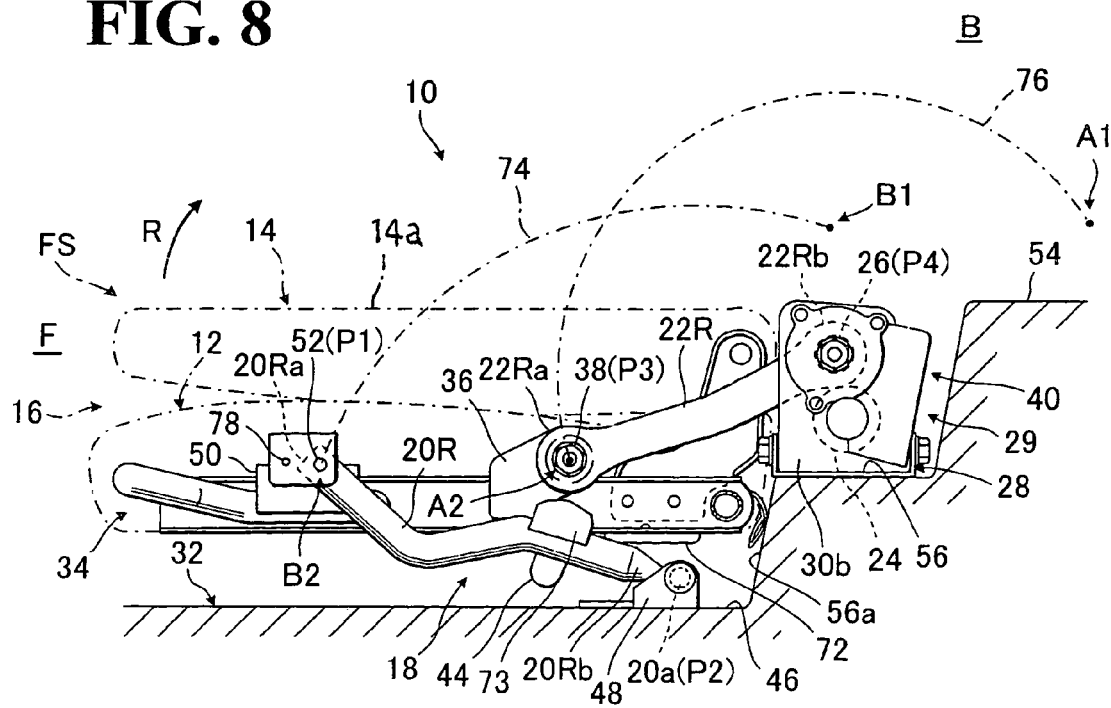
FIG. 8 is a schematic elevational side view which explanatorily shows the vehicle seat is set in a lower storage position.

Here, referring to FIGS. 1, 7 and 8, it can be observed that the upper pivotal support point (P3) for each of the first and second backward link members (22R) (22L) is to be rotated along an arcuate locus (76) between the upper use position (at A1) and the lower storage position (at A2), the arcuate locus (76) extending along a circle having its center at the central axis of the driving shaft (26 or at P4), whereas on the other hand, the upper pivotal support point (P1) for each of the first and second forward link members (20R) (20L) is to be rotated along an arcuate locus (74) between the upper use position (B1) and the lower storage position (B2), the carucate locus (76) extending along a circle having its center at the pin (20a or at P2).

Figure 6:
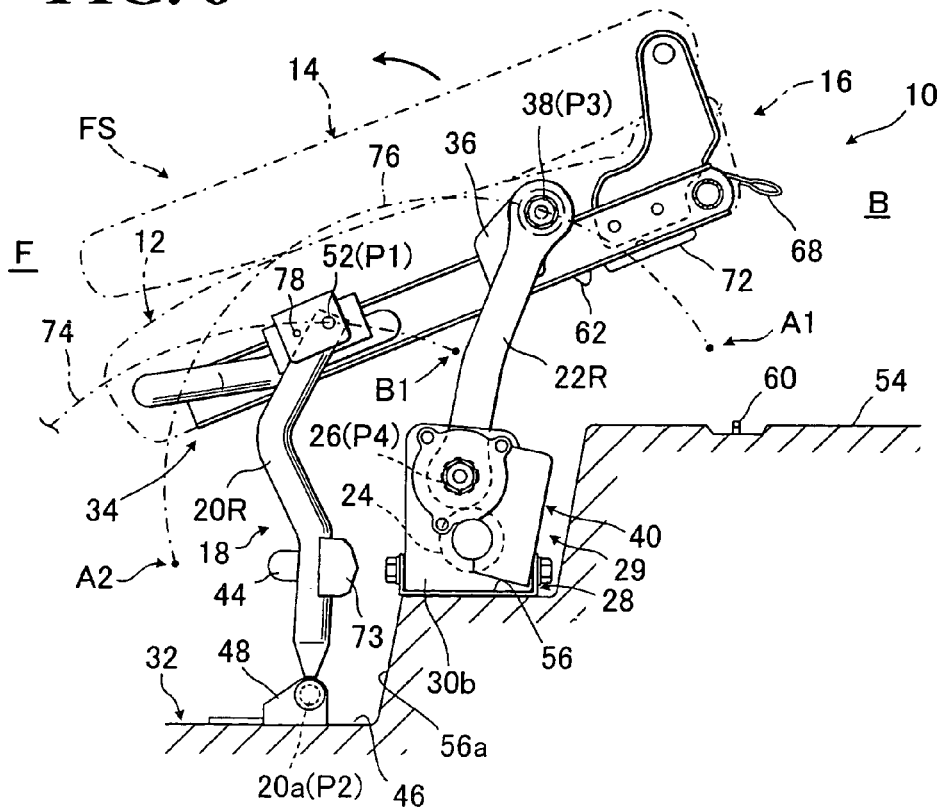
FIG. 6 is a schematic elevational side view which explanatorily shows further forward displacement of the vehicle seat.

Accordingly, with the rotation of driving shaft (26), the first and second backward link members (22R) (22L) are rotated in a direction along the arcuate locus (76) from the normal position as in FIG. 1 to the substantially quarter forward point as in FIG. 6, during which time, the first actuator pin (86-1) is also simultaneously rotated anticlockwise from the home position shown in FIG. 9 to the position shown in FIG. 10(A). At this point, it is seen that, with such rotation of the first and second backward link members (22R) (22L) to that substantially quarter forward point by a certain angle (α), the first actuator pin (86-1) has been rotated to a point where it is about to contact the end (82-1b) of the first torsion coil spring (82-1). Such certain angle (α) is defined as a blank angle within which the first actuator pin (86-1) is rotated freely before it receives a resilient repulsive counterforce given from the first torsion coil spring (82-1). In other words, within the range of such blank angle (α), as can be seen from FIG. 6, the basic seat unit (16), which is being inclined forwardly, does not reach such an angle that allows its relatively heavy weight to shift to the forward point where the corresponding downward load becomes directly applied to both first and second backward link members (22R) (22L). Thus, within that blank angle (α), no great load is applied through those two link members (22R) (22L) to the motor (24), and therefore, the basic seat unit (16) is smoothly inclined by an original torque of the driving shaft (26) or the motor (24) in the forward direction, as understandable from FIGS. 5 to 6.

During the above-described operation, the guide stopper pins (78) serves to prevent excessive forward inclination of the folded state (FS) of basic seat unit (16).

With further anticlockwise rotation of the driving shaft (26), both first and second backward link members (22R) (22L) as well as first and second forward link members (20R) (20L) are inclined forwardly and reach the above-noted angle at which the weight of basic seat unit (16) start shifting to the forward point, which substantially corresponds to a midway point on the arcuate locus (76) as shown in FIG. 7, whereupon an entire weight of the basic seat unit (16) is shifted donwardly, exerting a great load intensively upon the first and second backward link members (22R) (22L). This means that an increasing amount of forward or anticlockwise load is applied to the torque of the motor (24) via the driving shaft (26). But, at this point, from FIGS. 10(A) and 10(B), it is seen that the first actuator pin (86-1) is contacted with the engagement end (82-1b) of first torsion coil spring (82-1), and, as the second backward link member (22L) is rotated forwardly, the first actuator pin (86-1) is further rotated anticlockwise to push that torsion coil spring end (82-1b) backwardly out of engagement with the first engagement bracket (84a), whereby the first torsion coil spring (82-1) itself is twisted anticlockwise about the driving shaft (26) to increase its resilient repulsive force in clockwise direction about the driving shaft (26). Thus, an increasing resilient counterforce is applied from the first torsion coil spring (82-1) to the anticlockwise rotation of the driving shaft (26) which is amplified by the downwardly shifting gravity of the basic seat unit (16), whereby the thus-applied gravity of basic seat unit (16) is counterbalanced with the increasing resilient repulsive force of the first torsion coil spring (82-1), thereby giving no load to the torque of the motor (24) and allowing the motor (24) to maintain its original torque.

Further, in accordance with the illustrated embodiment, when the first and second backward link members (22R) (22L) are moved to the afore-stated midway point of arcuate locus (76) as in FIG. 7, the second actuator pin (86-2) is then rotated to contact with the engagement end (82-2b) of the second torsion coil spring (82-2) as shown in FIG. 12(B). In this regard, it is seen from the FIG. 12(B) that a blank angle (β) is given, by which the first and second backward link members (22R) (22L) are rotated from the home point (A1) to the midway point of arcuate locus (76), so that the second engagement pin (86-2) is rotated before it receives a resilient counterforce applied from the second torsion coil spring (82-2). Here, by taking a comparative look at FIGS. 10(A) and 10(B) and FIGS. 12(A) and 12(B), it is seen that, during the anticlockwise rotation of the first and second backward link members (22R) (22L) to the foregoing midway point of arcuate locus (76) as in FIG. 7 by the blank angle (β), the second actuator pin (86-2) is rotated from the home point (that can be seen from FIG. 2) to a contact point where it contacts the engagement end (82-2b) of the second torsion coil spring (82-2). Of course, during this rotation of second actuator pin (86-2) to that contact point, the first actuator pin (86-1) has already been contacted with the first torsion coil spring engagement end (82-1b), and thus, both first and second backward link members (22R) (22L) have already received an increasing resilient repulsive force applied from the first torsion coil spring (82-1) as described earlier.

With further anticlockwise rotation of the driving shaft (26), as the first backward short link member (22R) is rotated forwardly, the second actuator pin (86-2) is further rotated anticlockwise to push the end (82-2b) of the second torsion coil spring (82-2) backwardly out of engagement with the second engagement bracket (84b), whereby the second torsion coil spring (82-2) is twisted anticlockwise about the driving shaft (26) to increase its resilient repulsive force in clockwise direction about the driving shaft (26). Thus, in addition to the increasing resilient repulsive force from the first torsion coil spring (82-2), an increasing resilient repulsive counterforce is caused from that second torsion coil spring (82-2) against the anticlockwise rotation of the driving shaft (26) being amplified by further downwardly shifting gravity of the basic seat unit (16). Namely, the resilient repulsive force of the second torsion coil spring (82-2) will effectively increase in proportion to the donwardly shifting gravity of the basic seat unit (16) which occurs from a point substantially corresponding to the midway point of arcuate locus (76) as in FIG. 7. It is therefore appreciated that the increasing resilient repulsive force, which is applied from both first and second torsion coil springs (82-1) (82-2), becomes double to insure that the increasing amount of load applied to the driving shaft (26) is counterbalanced with the doubled resilient counterforces of those two torsion coil springs (82-1) (82-2), thereby preventing any load from being applied to the torque of the motor (24) and allowing an original torque of the motor (24) to be used in the present seat (10), without the necessity of using a new large motor with greater torque and any other associated aids. Hence, it is possible to minimize the motor as required and simplify the structure of the drive mechanism unit (29). Furthermore, with this two-step counterbalancing arrangement, the relatively heavy basic seat unit (16)

is displaced at a constant and stable speed, thus providing a comfortable and high-quality operation to a user or seat occupant.

In this way, as shown in FIG. 8, the first and second forward link members (20R) (20L) are displaced to their own lower storage positions (B2), while the first and second backward link members (22R) (22L) are displaced to their own lower storage positions (A2), whereupon the folded basic seat unit (16) is set in the storage position on the lower floor area (46), with the back surface of the seat cushion (14) extending horizontally along a plane substantially flush with the flat surface of the upper floor area (54).

It is to be appreciated that, owing to the above-explained arcuate locus (76) and distance between the home and storage points (A1) (A2), the backward short link members (22R) (22L) are to move forwardly faster than the forward long link members (20R) (20L) at the point of time when both forward and backward link members (20R, 20L) and (22R and 22L) have moved past their respective midway points of arcuate loci (76) (74), thereby causing the backward portion of the basic seat unit (16) to displace downwardly relative to the forward pivotal point (P1), so that the basic seat unit (14) is rotated down into the horizontal state shown in FIG. 8. when the forward long link members (20R) (20L) reach their storage points (B2).

Under the foregoing storage state of the seat (10) as in FIG. 8, naturally, both first and second torsion coil springs (82-1) (82-2) have been resiliently twisted by the above-described two-step rotation of the corresponding first and second actuator pins (86-1) (86-2), so that a certain increased amount of resilient repulsive force is accumulated in each of those twisted two torsion coil springs (82-1) (82-2). This accumulated resilient repulsive force will be used to counterbalance it with the weight or gravity of the basic seat unit (16) when returning the seat (10) to the upper use position, as will be described later.

When it is desired to return the seat (10) from the lower storage position on the lower floor area (46) to the upper use position on the upper floor area (54), another switch (not shown) is turned on to operate the motor (24) reversely, thereby causing reverse or clockwise rotation of the driving shaft (26). As a result, the first and second backward link members (22R) (22L), as driving links, are rotated clockwise relative to their lower pivotal support points (P4), whereby, simultaneously, the first and second forward link members (20R) (20L) are also rotated clockwise relative to their lower pivotal support points (P1). Thus, as shown in the arrow (R) in FIG. 8, the basic seat unit (16) is raised away from the storage position. At this stage, the resilient repulsive forces accumulated in both first and second torsion coil springs (82-1) (82-2) now act to give an additional force of clockwise rotation to the clockwise rotation of the driving shaft (26), so that the gravity of the basic seat unit (16) is counterbalanced with such accumulated resilient repulsive forces of both two torsion coil springs (82-1) (82-2), thereby giving no load to the reverse torque of the motor (24). Thus, during the clockwise rotation of the first and second backward short link members (22R) (22L) to the foregoing midway point of arcuate locus (76) as in FIG. 7, the double resilient forces from the first and second torsion coil springs (82-1) (82-2) are fully used. But, after the first and second backward short link members (22R) (22L) have been rotated past such midway point toward the home position at (A1), the center of gravity of the basic seat unit (16) is shifted toward the backward point, and therefore, the gravity of basic seat unit (16), acting on the first and second backward link members (22R) (22L), are generally reduced by half.

Accordingly, as can be seen from FIG. 12(C) to FIG. 12(B), the engagement end (82-2b) of second torsion coil spring (82-2) is returned to engagement with the second engagement hook bracket (84b), so that the second torsion coil spring (82-2) is inactive and does not give any additional force to the reverse rotation of the driving shaft (26). Thereafter, with further clockwise rotation of the first and second backward short link members (22R) (22L) from the foregoing midway point, the backwardly shifted gravity of basic seat unit (16) is now counterbalanced with the resilient repulsive force accumulated in the first torsion coil spring (82-1). Thus, the original torque of motor (24) is maintained, without any load being applied thereto from the basic seat unit (16). In this way, as viewed reversely from FIG. 6 to FIG. 5 and jumping over to FIG. 1, it is to be seen that the first and second forward link members (20R) (20L) are displaced to their own home positions (B1), while the first and second backward link members (22R) (22L) are displaced to their own home positions (A1), whereupon the folded state (FS) of basic seat unit (16) is set in the upper use position on the upper floor area (54) as in FIG. 1.

Although not shown, it is of course arranged with proper control systems such that the motor (24) is automatically stopped when the basic seat unit (16) reaches the lower storage position (i.e. the backward shout link members (22R and 22L) arrive at the lower storage points (A2)) and also automatically stopped when the basic seat unit (16) reaches the upper use position (i.e. the backward short link members (22R and 22L) arrive at the upper use points (A1).

Accordingly, in accordance with the present invention, the four-point link articulation structure defined above is quite simple mechanically and inexpensive cost-wise, because its mechanical arrangement is simply such that a first inclination angle ($\theta_1$) is properly given to both two forward long link members (20R) (20L), while a second inclination angle ($\theta_2$) smaller than the first inclination angle ($\theta_1$) is properly given to both two backward short link members (20R) (20L), and that the drive mechanism unit (29) is simply connected with the backward short link members (20R) (20L). With this simplified structure, it is easily possible to achieve a powered retractable seat and mount the same on a typical three-stepwise terraced type of vehicle floor which is in general use for retractable seats of this kind. Moreover, this novel structure effectively realizes the following points: (i) the basic seat unit (14) can be set on a horizontal plane in both of the upper use position and lower storage position, and (ii) the upper pivotal support points (P1) (P3) respectively of the forward and backward link members (20R and 20L) (22R and 22L) are displaced along their respective given arcuate loci (74) (76), which is substantially identical to a manual rotatative displacement of the seat (10) effected by a user or seat occupant between the upper use position and lower storage position, thus providing a natural and smooth automated operation of the seat, without any labor required on the side of seat occupant. In addition thereto, the resilient repulsion providing means (82), or the two torsion coil springs (82-1) (82-2) for example, act to prevent the weight of the basic seat unit (16) from being directly applied to the torque of the motor (24), as described above, thereby eliminating the need to increase the torque of motor (24) and minimizing the size of motor to be used and contributing to simplification of the drive mechanism unit (29).

While having described the present invention thus far, it should be understood that the invention is not limited to the illustrated embodiment, but any other modification, replacement, and addition may be applied thereto without departing from the scopes of the appended claims.

What is claimed is:

1. A vehicle seat of retractable type in combination with a vehicle floor including an upper floor area and a lower floor area, which is retractable from an upper use position on said upper floor area to a lower storage position on said lower floor area, or vice versa, comprising:
   a basic seat unit comprising a seat cushion and a seat back rotatably connected with said seat cushion, wherein said seat back is foldable down onto said seat cushion to provide a folded state of said basic seat unit, said basic seat unit having a forward portion facing to a forward side of said vehicle seat, and a backward portion facing to a backward side of said vehicle seat;
   a rotary support link mechanism operatively connected between said basic seat unit and said vehicle floor so as to allow displacement of the basic seat unit between said upper use position and said lower storage position, said rotary support link mechanism comprising;
   at least one forward link element having: an upper pivotal support point pivotally connected with said forward portion of said basic seat unit; and a lower pivotal support point pivotally connected with said lower floor area, said at least one forward link element being rotatable relative to the lower pivotal support point thereof in one of a forward direction to the forward side of said vehicle seat and a backward direction to the backward side of said vehicle seat;
   at least one backward link element having: an upper pivotal support point pivotally connected with said backward portion of said basic seat unit; and a lower pivotal support point, said at least one backward link element being rotatable relative to the lower pivotal support point thereof in one of a forward direction to said forward side of said vehicle seat and a backward direction to said backward side of said vehicle seat; and
   said at least one backward link element being smaller in length than said at least one forward link element, whereby a distance between said upper and lower pivotal support points of said at least one forward link element is different from a distance between said upper and lower pivotal points of said at least one backward link element,
   wherein said lower pivotal support point of said at least one backward link element is disposed backwardly of and above said lower pivotal support point of said at least one forward link element,
   with such an arrangement that, when said basic seat unit is set in said upper use position, said at least one forward link element is inclined toward said backward side of said vehicle seat at a backward inclination angle, whereas said at least one backward link element is inclined toward said backward side of said vehicle seat at a backward inclination angle which is smaller than said backward inclination angle of said at least one forward link element, whereby said basic seat unit is normally set in a substantially horizontal state upon said upper floor area;
   a drive element including a motor and a driving shaft which is operatively connected with said motor and fixedly connected with a lower end portion of said at least one backward link element which corresponds to said lower pivotal support point of the at least one backward link element, wherein, upon operation of said motor, said driving shaft is rotated causing said at least one backward link element to rotate in said forward direction, causing simultaneous forward rotation of said at least one forward link element, thereby inclining and displacing said folded state of said basic seat unit in said forward direction from the substantially horizontal state, down to the lower storage position, so that, at said particular lower storage position, said folded state of said basic seat unit is set in a substantially horizontal state upon said lower floor area, whereas, upon reverse operation of said motor, said driving shaft is subjected to a reverse rotation to thereby cause said at least one backward link element to rotate in said backward direction, causing simultaneous backward rotation of said at least one forward link element, thereby inclining the folded state of the basic seat unit upwardly from the substantially horizontal state and displacing the basic seat unit from the lower storage position in the backward direction up to the upper use position; and
   a resilient repulsive element provided to said driving shaft, said resilient repulsive element being workable so as to increase said driving shaft resilient repulsive force in proportion to an amount of said normal rotation of said driving shaft, thereby providing an increasing resilient repulsive force against the normal rotation of the driving shaft, with a correspondingly increased amount of said resilient repulsive force being simultaneously accumulated in said resilient repulsive element, whereby, when said basic seat unit is displaced from said upper use position to said lower storage position, a load being applied from said basic seat unit to a normal torque of said motor caused by said normal operation of the motor is counterbalanced with said increasing resilient repulsive force of said resilient repulsive element, and, conversely, when said basic seat unit is displaced from said lower storage position to said upper use position, a load being applied from said basic seat unit to a reverse torque of said motor caused by said reverse operation of the motor is counterbalanced with said correspondingly increased amount of said resilient repulsive force accumulated in said resilient repulsive element.

2. The vehicle seat as claimed in claim 1, further comprising a lock/switch device for not only locking and unlocking said basic seat unit to and from said upper use position on said upper floor area, but also switching on to cause operation of said motor simultaneous with said unlocking of said back seat unit.

3. The vehicle seat according to claim 2, wherein said lock/switch device comprises: a striker fixed on said upper floor area; a latch element movable for engagement with and disengagement from said striker; and a switch means having an operative relation with said latch element, said switch means being electrically connected with said motor, with such an arrangement that turning on said switch means causes said simultaneous movement and disengagement of said latch element from said striker, while simultaneously switching on said motor for operation to cause said backward link means to rotate in the forward direction.

4. The vehicle seat as claimed in claim 1, wherein said resilient repulsive element comprises: a torsion spring wound about said driving shaft, said torsion spring having one end and another end; a securing element to which said one end of said torsion spring means is fixedly secured; a bracket for normally receiving said another end of said torsion spring and allowing said another end to be disengaged therefrom; and an actuator fixed on said driving shaft, said actuator being rotatable with said normal rotation of said driving shaft in a direction to contact and push said another end of said torsion spring means out of engagement with said bracket, and wherein, when said folded state of said basic seat unit is displaced from said upper use position to said lower storage position, said actuator is rotated to push said another end of said torsion spring out of engagement with said bracket, thereby twisting said torsion spring to generate said increasing resilient repulsive force against the normal rotation of said driving shaft, with said correspondingly increased amount of said resilient repulsive force being simultaneously accumulated in the torsion spring, whereby said load being applied to said normal torque of said motor is counterbalanced with said increasing resilient repulsive force of said torsion spring, and, conversely, when said basic seat unit is displaced from said lower storage position to said upper use position, said load being applied to said reverse torque of said motor is counterbalanced with said correspondingly increased amount of said resilient repulsive force accumulated in said torsion spring.

5. The vehicle seat as claimed in claim 4, wherein said actuator is disposed on said driving shaft, such that said actuator is not contacted with said another end of said torsion spring until after said folded state of said basic seat unit have been displaced with said normal rotation of said driving shaft to a point where a weight or gravity thereof is shifted to apply an increasing amount of said load to said normal torque of said motor.

6. The vehicle seat as claimed in claim 4, wherein said torsion spring comprises a first torsion spring and a second torsion spring, each of which has a base end corresponding to said one end of the torsion spring and an engagement end corresponding to said another endof the torsion spring, wherein said first and second torsion springs are wound about said driving shaft in a spaced-apart relation with each other, wherein said securing element comprises: a first securing element to which said base end of said first torsion spring is fixedly secured; and a second securing element to which said base end of said second torsion spring is fixedly secured, wherein said bracket comprises: a first engagement bracket for normally receiving said engagement end of said first torsion spring and allowing the first engagement bracket to be disengaged therefrom; and a second engagement bracket for normally receiving said engagement end of said second torsion spring and allowing the same to be disengaged therefrom, wherein said actuator comprises a first actuator pin which is fixed on said driving shaft, such that, with the normal rotation of the driving shaft, the first actuator pin is rotated to contact with said engagement end of said first torsion spring and push the same out of engagement with said first engagement bracket; and a second actuator pin which is fixed on said driving shaft, such that, with the normal rotation of the driving shaft, the second actuator pin is rotated to contact with said engagement end of said second torsion spring and push the same out of engagement with said second engagement bracket, and wherein said first and second actuator pins are disposed in a different angular relation with each other relative to a central axis of said driving shaft.

7. The vehicle seat as claimed in claim 1, wherein said vehicle floor includes an intermediate floor area defined between said upper and lower floor areas, wherein said drive element includes a transmission/reduction gear portion through which said motor is operatively connected with said driving shaft, wherein said drive element is formed as one unit of drive element in which said motor, said driving shaft, and said transmission/reduction gear portion are collectively provided, and wherein said one unit of drive element is fixedly mounted on said intermediate floor area.

8. The vehicle seat as claimed in claim 1, wherein said drive element includes a transmission/reduction gear portion through which said motor is operatively connected with said driving shaft, and wherein said drive element is formed as one unit in which said motor, said driving shaft, said resilient repulsive element and said transmission/reduction gear portion are collectively provided.

* * * * *